United States Patent [19]

Kazmark, Jr.

[11] Patent Number: 5,941,543
[45] Date of Patent: Aug. 24, 1999

[54] COLLAPSIBLE CART

[75] Inventor: Eugene A. Kazmark, Jr., Joliet, Ill.

[73] Assignee: Remin Laboratories, Inc., Joliet, Ill.

[21] Appl. No.: 08/825,413

[22] Filed: Mar. 28, 1997

Related U.S. Application Data

[63] Continuation of application No. 08/309,947, Sep. 21, 1994, abandoned, which is a continuation-in-part of application No. 08/139,454, Oct. 20, 1993, Pat. No. 5,414,895.

[51] Int. Cl.$^6$ ..................................................... B62B 3/00
[52] U.S. Cl. ................................ 280/47.29; 280/47.371; 280/655
[58] Field of Search ........................... 280/47.34, 47.37, 280/47.2, 47.315, 47.27, 47.28, 47.29, 47.18, 655.1, 655, 654, 35

[56] References Cited

U.S. PATENT DOCUMENTS

| | | | |
|---|---|---|---|
| 1,532,700 | 4/1925 | Kinsella | 280/47.29 |
| 2,096,994 | 10/1937 | Millen | 280/47.27 |
| 2,519,113 | 8/1950 | Cohn | 280/47.29 |
| 2,820,643 | 1/1958 | Cohn | 280/34 |
| 3,572,870 | 3/1971 | Marks | 312/244 |
| 3,655,212 | 4/1972 | Krass et al. | 280/47.28 |
| 3,702,016 | 11/1972 | Keesee | 16/111 |
| 3,785,669 | 1/1974 | Doheny | 280/47.27 |
| 3,998,476 | 12/1976 | Kazmark, Sr. | 280/655 |
| 4,046,391 | 9/1977 | Restad et al. | 280/47.27 |
| 4,284,287 | 8/1981 | Esposito | 280/47.37 |
| 4,335,897 | 6/1982 | Muller, Jr. | 280/47.18 |
| 4,354,689 | 10/1982 | Perego | 280/47.37 |
| 4,523,773 | 6/1985 | Holtz | 280/654 |
| 4,577,877 | 3/1986 | Kassai | 280/47.37 |
| 4,754,985 | 7/1988 | Im et al. | 280/40 |
| 4,896,897 | 1/1990 | Wilhelm | 280/655 |
| 4,921,270 | 5/1990 | Schoberg | 280/47.28 |
| 4,974,871 | 12/1990 | Mao | 280/47.371 |
| 5,024,458 | 6/1991 | Kazmark et al. | 280/645 |
| 5,127,664 | 7/1992 | Cheng | 280/655 |
| 5,178,404 | 1/1993 | Chen | 280/655 |
| 5,228,716 | 7/1993 | Dahl | 280/47.34 |
| 5,368,143 | 11/1994 | Pond et al. | 280/655.1 |
| 5,374,073 | 12/1994 | Hung-Hsin | 280/655 |

FOREIGN PATENT DOCUMENTS

| | | |
|---|---|---|
| 0 294 249 | 12/1988 | European Pat. Off. . |
| 1 519 956 | 8/1978 | United Kingdom . |
| 2 143 481 | 2/1985 | United Kingdom . |
| 2 158 399 | 4/1985 | United Kingdom . |
| 2 172 250 | 4/1986 | United Kingdom . |
| 2 180 801 | 4/1987 | United Kingdom . |
| 2 259 890 | 3/1993 | United Kingdom . |
| 2 269 787 | 2/1994 | United Kingdom . |

*Primary Examiner*—Paul N. Dickson
*Attorney, Agent, or Firm*—Tilton, Fallon, Lungmus & Chestnut

[57] ABSTRACT

A collapsible cart includes a pivotable platform, a pivotable handle, and collapsible and adjustable tube assemblies for placing the cart in an extended or retracted position. The cart opens to a two-wheel hand truck or a four-wheel cart. It also closes to a compact configuration, making it highly portable and easy to store.

3 Claims, 6 Drawing Sheets

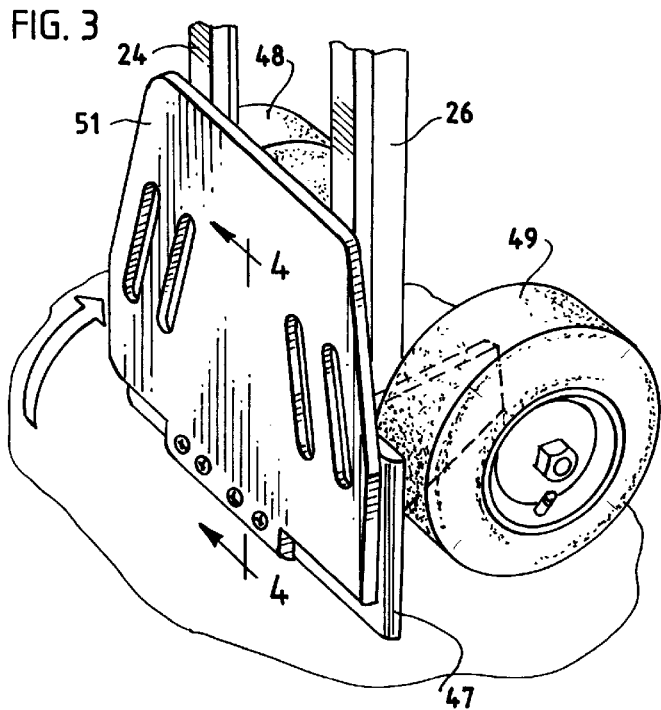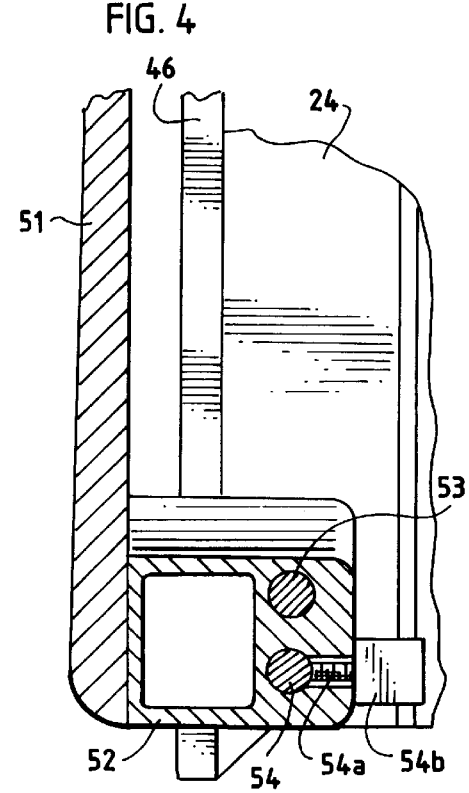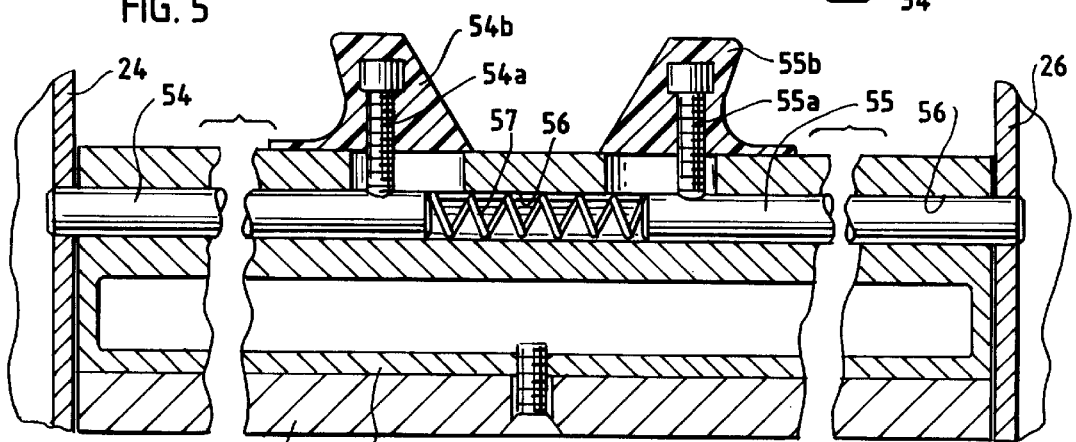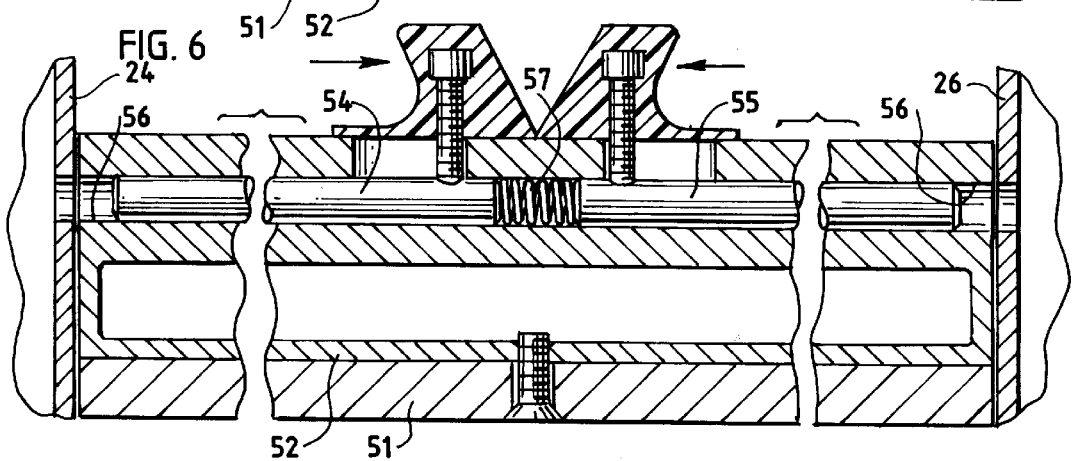

COLLAPSIBLE CART

This application is a continuation of application Ser. No. 08/309,947, filed Sep. 21, 1994 abandoned, which is a cip of Ser. No. 08/139,454, filed Oct. 20, 1993 now U.S. Pat. No. 5,414,895.

FIELD OF THE INVENTION

The present invention relates to a collapsible cart or hand truck and more particularly to a hand truck with a pivotable platform, a pivotable handle and collapsible and adjustable tube assemblies for placing the hand truck in an extended or retracted position.

DESCRIPTION OF THE PRIOR ART

The prior art includes a wide variety of two-wheel and four-wheel hand trucks and carts. For example, Mao U.S. Pat. No. 4,974,871 describes a foldable hand truck. This hand truck includes an upper handle section, a lower handle section, a platform, front wheels, and rear wheels. A pivot assembly connects the upper handle section to the lower handle section and allows one section to pivot relative to the other. A platform retraction mechanism mounted to the lower handle allows a user to retract the platform. This mechanism includes a slidable housing which engages the underside of the platform and drives it to predetermined positions. A locking assembly locks the housing and the connected platform at those predetermined positions on the lower handle.

The hand truck described above and other such prior art devices suffer a number of disadvantages. The hand truck of U.S. Pat. No. 4,974,871 is a complex device; and it does not have a durable construction. It comprises a large number of components which increase the expense of manufacture and assembly and make it susceptible to malfunctions. Other, more durable devices suffer other disadvantages. They have increased weight and bulk, and a user cannot easily transport them from location to location or store them when not in use.

The collapsible cart of the present invention avoids the disadvantages of the prior art devices. It is a durable construction which opens to a two-wheel hand truck or a four-wheel cart and allows an operator to use it for many applications. It also closes to a compact configuration in which it becomes highly portable and easy to store.

SUMMARY OF THE INVENTION

In accordance with one embodiment of the present invention, a collapsible cart includes a first and second tube assembly disposed in substantially parallel, spaced relation. The first tube assembly includes a first and second tube, with the first tube extending into the second tube in telescoping relation with the second tube. The second tube assembly includes a third and fourth tube, with the third tube extending into the fourth tube in telescoping relation with the fourth tube.

The cart also includes a pivotable platform member secured to end portions of the second and fourth tubes, a pivotable handle member secured to end portions of the first and third tubes; and first wheel means rotatably mounted to the tube assemblies proximate the platform member. The cart may also include hand grips and second wheel means rotatably mounted to the end portions of the first and third tubes.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 3 is a partial perspective view of the bottom portion of the collapsible cart, showing the pivotable platform member in a closed position;

FIG. 4 is a sectional view taken along line 4—4 in FIG. 3;

FIG. 5 is a sectional view taken along line 5—5 in FIG. 1, showing a pair of latching rods (disposed in an engaged position) for the platform member;

FIG. 6 is the sectional view of FIG. 5 showing the latching rods in a retracted position;

While the following disclosure describes the invention in connection with one embodiment and a modification one should understand that the invention is not limited to this embodiment. Furthermore, one should understand that the drawings are not to scale and that graphic symbols, diagrammatic representatives, and fragmentary views, in part, illustrate the embodiment. In certain instances, the disclosure may not include details which are not necessary for an understanding of the present invention such as conventional details of fabrication and assembly.

DETAILED DESCRIPTION OF THE DRAWINGS AND AN EMBODIMENT

Figure 1A:
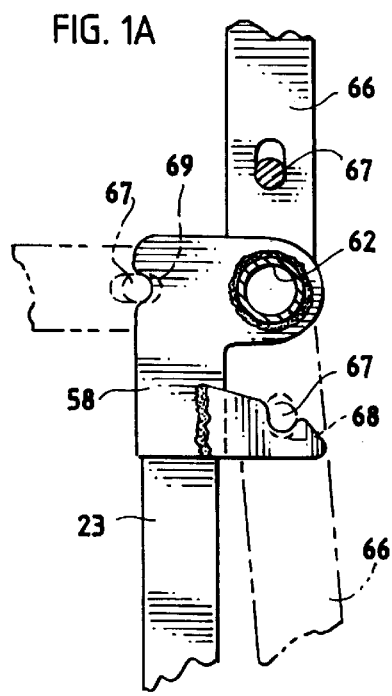
FIG. 1A is a sectional view taken along line 1A—1A in FIG. 1, showing a pivot connection for a pivotable handle member in the cart's handle assembly.
Figure 1:
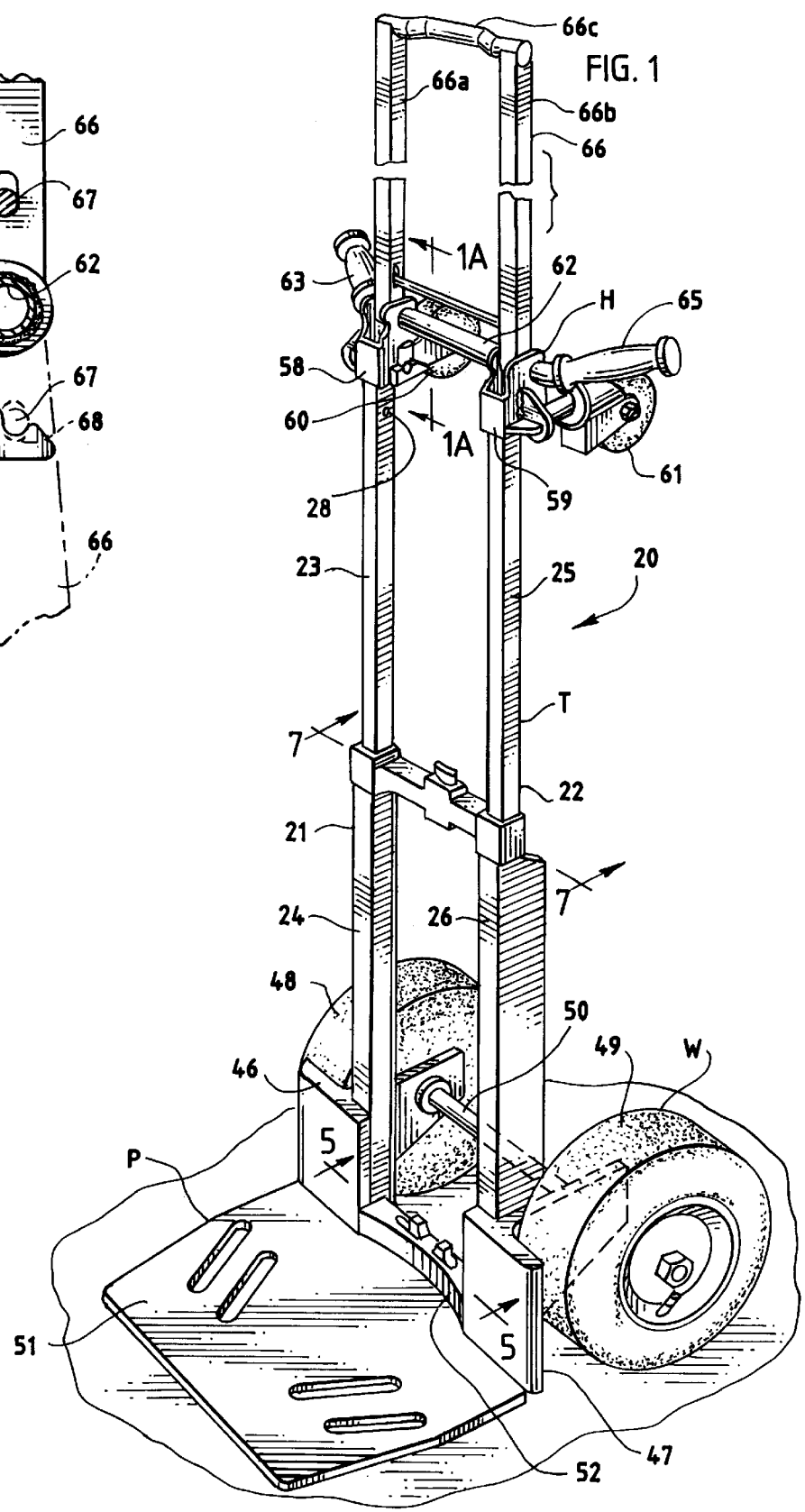
FIG. 1 is a perspective view of the collapsible cart of the present invention, showing the cart in an open, upright position in which it serves as a two-wheel hand truck.

Turning now to the drawings, FIG. 1 shows the collapsible cart of the present invention at 20. The cart generally includes a tube arrangement T, a platform support P, a handle assembly H, and a wheel assembly W. The cart opens to an extended configuration in which it may function as a two-wheel hand truck (See FIG. 1) or a four-wheel cart (See FIG.

2). It also retracts to a compact configuration (not shown) for storage and transport.

The tube arrangement T includes a pair of telescoping tube assemblies 21 and 22 disposed in parallel relation to each other. The assembly 21 includes a first tube 23 and a second tube 24. The assembly 22 includes a third tube 25 and a fourth tube 26. The lower tubes 24 and 26 have the same length; and they receive, in sliding and telescoping relation, the upper tubes 23 and 25. Each of the lower tubes 24 and 26 has a generally rectangular portion that defines a rectangular bore for receiving one of the upper tubes and a flange or plate portion that extends the length of the tube for support.

The upper tubes 23 and 25 have substantially the same length and cross-sectional configuration. The tube 23 extends into the tube 24; and the tube 25 extends into the tube 26. All four of these tubes 23–26 are made of aluminum which provides the requisite strength and rigidity yet minimizes the weight of the cart. Alternatively, the tubes 23–26 may be made of stainless steel or any other suitable material. In addition, although the embodiment shown includes rectangular tubes, the tubes may have a rounded configuration or any other suitable cross-sectional configuration.

Figure 2:
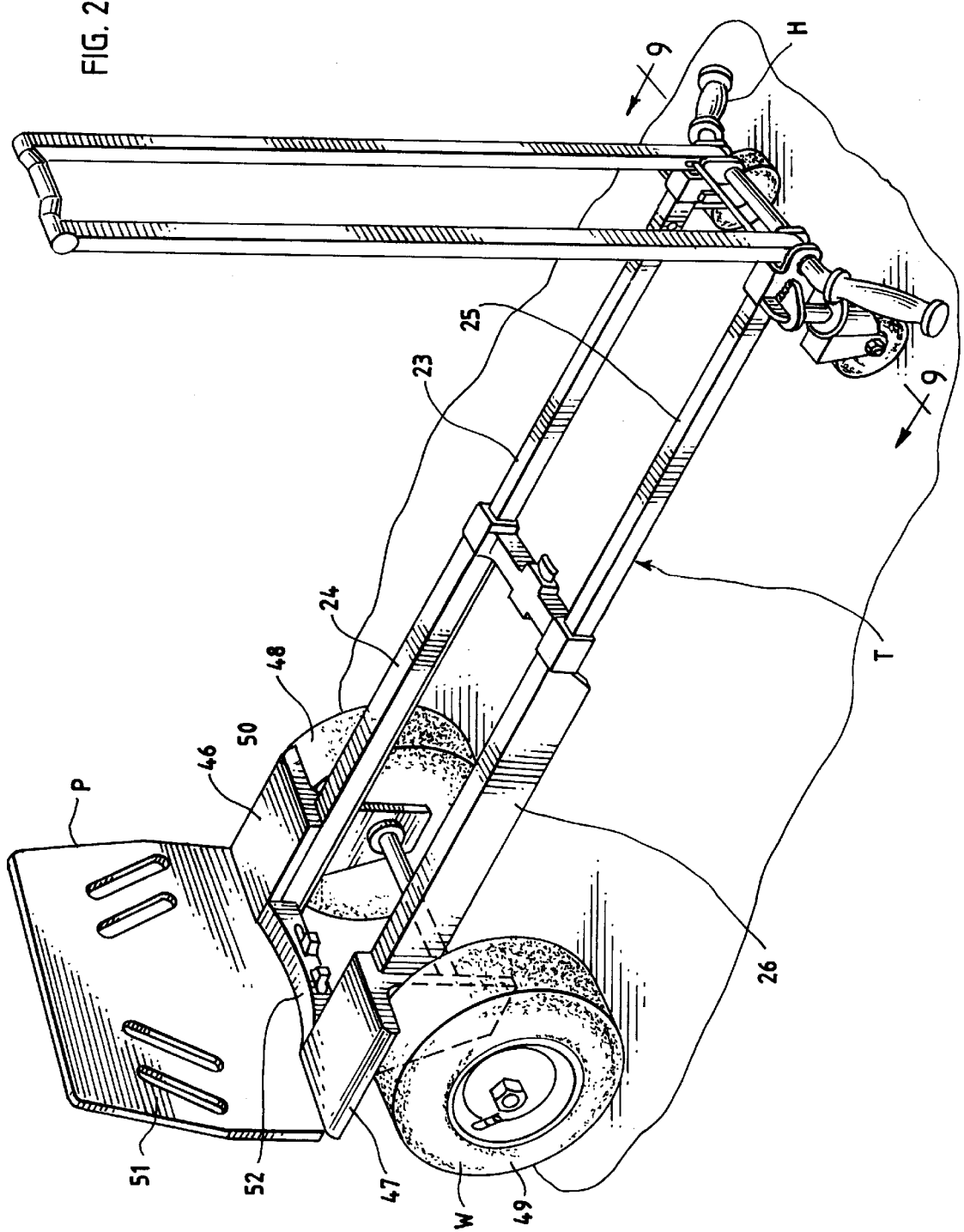
FIG. 2 is a perspective view of the collapsible cart, showing the cart in a configuration in which it functions as a four-wheel vehicle.
Figure 7:
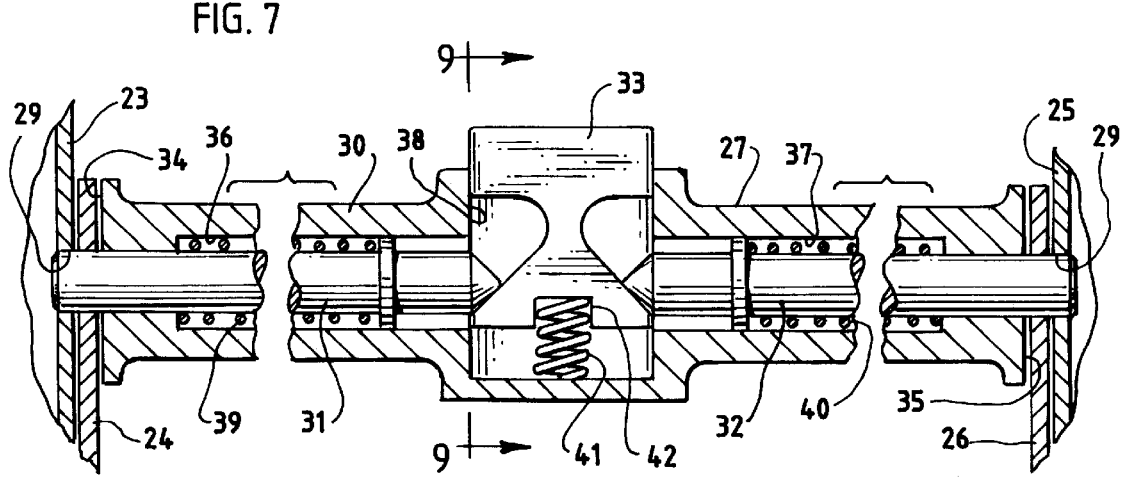
FIG. 7 is a sectional view taken along line 7—7 in FIG. 1, showing a pair of locking rods for the cart's tube assemblies disposed in an engaged position.
Figure 8:
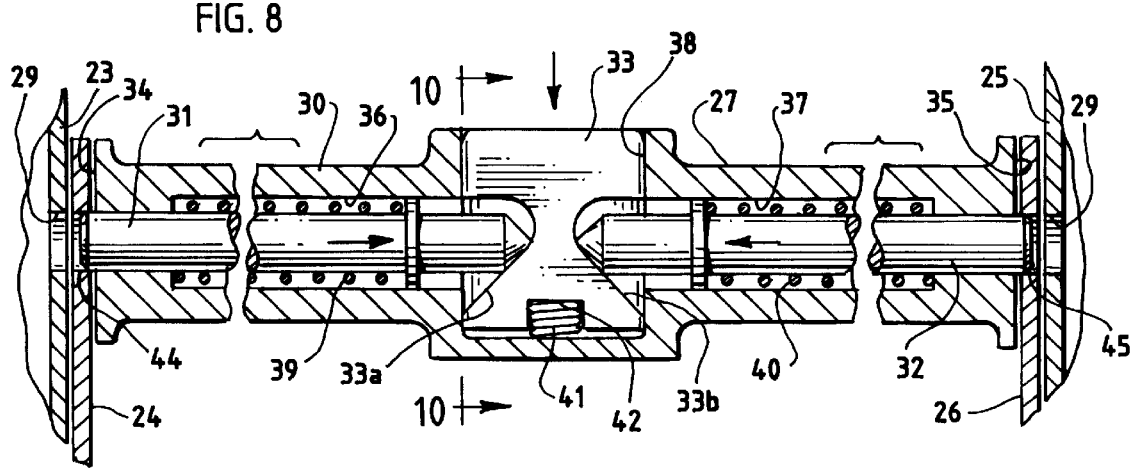
FIG. 8 is the sectional view of FIG. 7, showing the locking rods in a retracted position.
Figure 9:
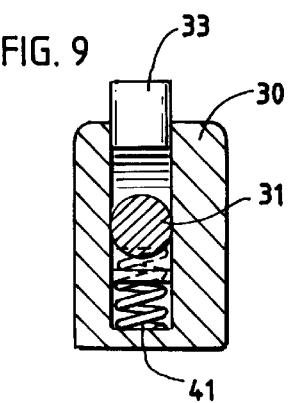
FIG. 9 is a sectional view taken along line 9—9 in FIG. 7.
Figure 10:
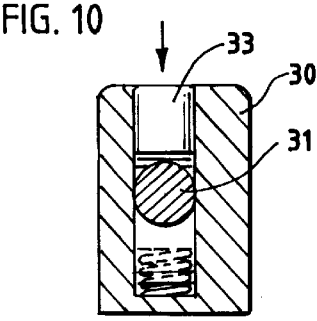
FIG. 10 is a sectional view taken along line 10—10 in FIG. 8.

An actuating and locking apparatus 27 disposed at the top end portions of the tubes 24 and 26 cooperate with openings at the top and bottom end portions of the tubes 23 and 25 to lock the tubes 23 and 25 in an extended position shown in FIGS. 1 and 2 and a retracted position (not shown) in which substantially the entire length of the tube 23 and 25 lies within the tube 24 and 26, respectively. (FIG. 1 shows an opening 28 at the top end of the tube 23, and FIGS. 7 and 8 show openings 29 at the bottom ends of the tubes 23 and 25.) Alternatively, each of the tubes 23 and 25 may define more than two openings. They may include openings along their lengths to allow a user to lock the top section of the tube arrangement in a large number of positions.

The apparatus 27 generally includes a housing 30, a pair of spring loaded locking rods 31 and 32, and a spring loaded plunger 33. The housing 30 is made of aluminum or any other material of sufficient strength and rigidity. It defines a bore 34 through which the tube assembly 21 extends and a bore 35 through which the tube assembly 22 extends. The housing 30 also defines a bore 36 which receives the locking rod 31 and a bore 37 which receives the locking rod 32.

These bores 36 and 37 lie generally perpendicularly to the bores 34 and 35 and parallel to each other. They have a diameter of predetermined magnitude, allowing sliding, reciprocating movement of the locking rods. At one end they communicate with a bore 38 which contains the plunger 33. At an opposite end, each of the bores 36 and 37 has a reduced diameter and communicates with either the bore 34 or the bore 35. The locking rods extend through the reduced diameter portions of the bores 36 and 37 and into the openings in the tubes 23 and 25 (as described below) to lock the tube arrangement T in predetermined positions.

Each of the rods 31 and 32 is a round, elongate member with a flange portion and a main rod portion (e.g., a bolt with a ring member press against, or otherwise fixedly secured to, the bolt). A spring 39 disposed around the rod 31 engages the housing 30 at its one end and the flange portion of the rod 31 at its other end to bias the rod 31 towards the plunger 33. Similarly, a spring 40 disposed around the rod 32 engages the housing 30 at one end and the flange portion of the rod 32 at the other end to bias the rod 32 towards the plunger 33.

As stated above, the opening 38 receives the plunger 33 in sliding relation so that a user may move the plunger 33 between the positions shown in FIGS. 7 and 8. A spring 41 disposed between an opening 42 of the plunger 33 and the back of the opening 38 biases the plunger 33 to the position shown in FIG. 7. A user may push the plunger 33 inwardly of the housing 30 overriding the force of the spring 41 and placing the plunger in the position shown in FIG. 8.

During this reciprocating movement of the plunger 33, tapered ends of the rods 31 and 32 slide along camming grooves 33a and 33b, respectively. These grooves lie at an acute angle to the sides of the bore 38 which extends perpendicularly to the bores 36 and 37. In operation, when the openings in the tubes 23 and 25 register with the bores 36 and 37, the ends of the locking rods 31 and 32 move into the tubes 23 and 24 through openings 44 and 45 in the tubes 24 and 26, respectively, and lock the tube arrangement T in a predetermined position. The force provided by the spring 41 is greater than the combined force of the springs 39 and 40. Accordingly, the locking rods 31 and 32 remain in the position shown in FIG. 7. If one pushes the plunger or button 33 inwardly of the housing 30 to the position shown in FIG. 8, the rods 31 and 32 slide towards the plunger 33 and out of the tubes 23 and 25, allowing the tubes 23 and 25 to slide relative to the tubes 24 and 26.

The housing 30 cooperates with the wheel assembly W, the platform support P and the handle assembly H to maintain parallelism between the tube assemblies 21 and 22. The wheel assembly W and the platform support P lie at one end of the tube assemblies 21 and 22; and the handle assembly H lies at the opposite end. The wheel assembly W includes two support brackets 46 and 47, two wheels 48 and 49, and an axle 50 which rotatably mounts the wheels to the brackets (See FIGS. 1–3). The bracket 46 has a generally T-like configuration and lies bolted or otherwise fixedly secured to the bottom end portion of the tube 24. Similarly, the bracket 47 has a generally T-like configuration and lies locked or otherwise fixedly secured to the bottom end portion of the tube 26. The axle 50 extends through the brackets 46 and 47, as shown in FIGS. 1 and 2, to rotatably mount the wheels to the brackets.

The platform support P receives or engages the various objects placed on the cart 20. It includes a flat, plate-like platform member 51 made out of extruded aluminum or any other material of high strength and rigidity. The platform member 51 lies fixedly mounted (e.g., bolted) to an elongate, generally rectangular housing 52 that extends between the tubes 24 and 26 and has a predetermined length which allows it to rotate between those tubes. This housing 52 rotates about an axle 53 which extends through a bore in the housing 52 and into the tubes 24 and 26. It rotates approximately 90°, between a position in which the platform member 51 lies generally parallel to the tubes 24 and 26 (a closed or retracted position, See FIGS. 3 and 4) and a position in which the platform member 51 lies generally perpendicularly to the tubes 24 and 26 (an open or extended position, See FIGS. 1 and 2).

A pair of latching rods 54 and 55 disposed in the housing 52 lock the member 51 and the housing 52 in the two positions described above. These rods lie in the housing 52, slidably mounted in a bore 56 which extends generally parallel to the bore for the axle 53, for movement between the position shown in FIG. 5 and the one shown in FIG. 6. A spring 57 disposed between the latching rods 54 and 55 biases the rods to the position shown in FIG. 5. Each rod has a pin secured to it; and the pin extends outwardly of the housing 52 through a suitably sized opening to connect the rod to a knob that an operator may use to move the rod to the position shown in FIG. 6. A pin 54a connects the rod 54 to a knob 54b; and a pin 55a connects the rod 55 to a knob 55b.

In the position shown in FIG. 5, the rod 54 extends into an opening in the tube 24; and the rod 55 extends into an opening in the tube 26. Each one of the tubes 24 and 26 has two openings adjacent the housing 52, one corresponding to the open position of FIGS. 1 and 2 and the other corresponding to the position of FIG. 3.

The handle assembly H lies secured to the top end portions of the tubes 23 and 25. This assembly H includes a bracket 58 which receives the top end of the tube 23 and a bracket 59 which receives the top end of the tube 25. Various means may secure the brackets 58 and 59 to the tubes 23 and 25, including welding connections for permanent placement or a screw connection for removable placement of the handle assembly H on the tubes 23 and 25.

Each of the brackets 58 and 59 has a yoke-like upper portion and a box-like lower portion with an open bottom for receiving one of the tubes 23 or 25. Casters 60 and 61 mounted to the bracket 58 and 59, respectively, allow the cart 20 to function as a two-wheel cart, as shown in FIG. 2. A bar or tube 62 extends through the yoke-like upper portions of the brackets 58 and 59, includes hand grips 63 and 65 at its end portions, and lies welded or otherwise fixedly secured in the position shown in FIGS. 1 and 2. (An operator may use the hand grips to maneuver the cart when using the cart as a two-wheel hand truck.)

A pivoting handle member 66 pivots between a position shown in FIG. 2 (where it acts as a support for objects placed on the cart) and a storage position shown in phantom lines in FIG. 1A. (In this second position, the member 66 lies generally parallel to the tube assemblies on the wheel side of the cart.) The handle member 66 has a channel-like configuration and comprises tubes that define two legs 66a and 6b and a cross bar 66c. The bar 62 extends through the lower portions of the legs 66a and 66b, and the member 66 pivots about the bar 62.

A locking bar 67 which extends between the legs 65a and 65b of the pivoting member 67 locks the member 67 in the two positions shown in FIG. 1A. This bar 67 has a "sloppy" engagement with the legs (at the openings through which it extends into the legs). Thus, it releasably engages the bracket at the grooves 68 and 69 in each of the brackets 58 and 59. The weight of the bar 67 keeps it in these grooves when the cart has assumed the proper position.

Figure 11:
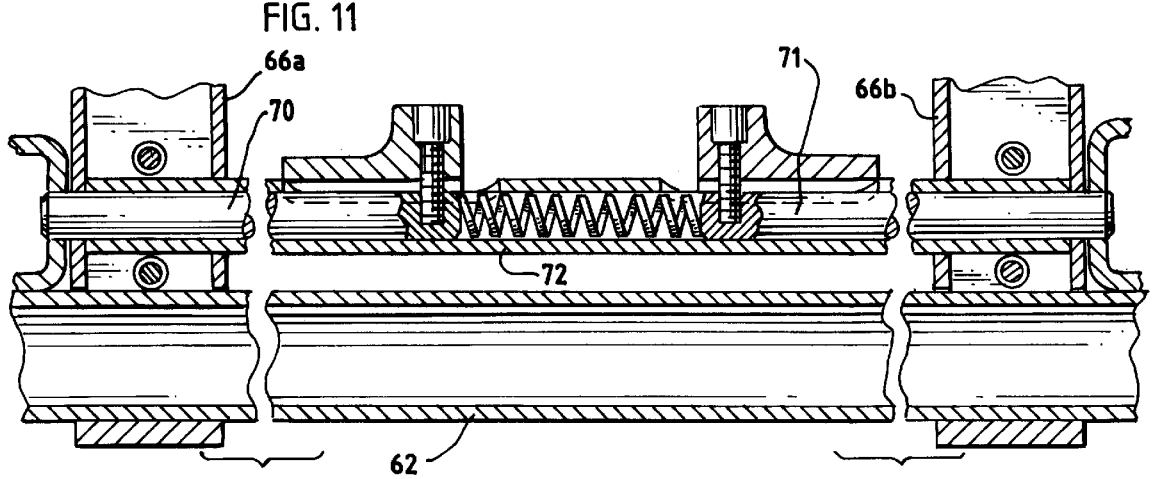
FIG. 11 is a sectional view taken along the pivot axis of the pivotable handle member, showing a modified locking arrangement with a pair of locking pins disposed in an engaged position.
Figure 12:
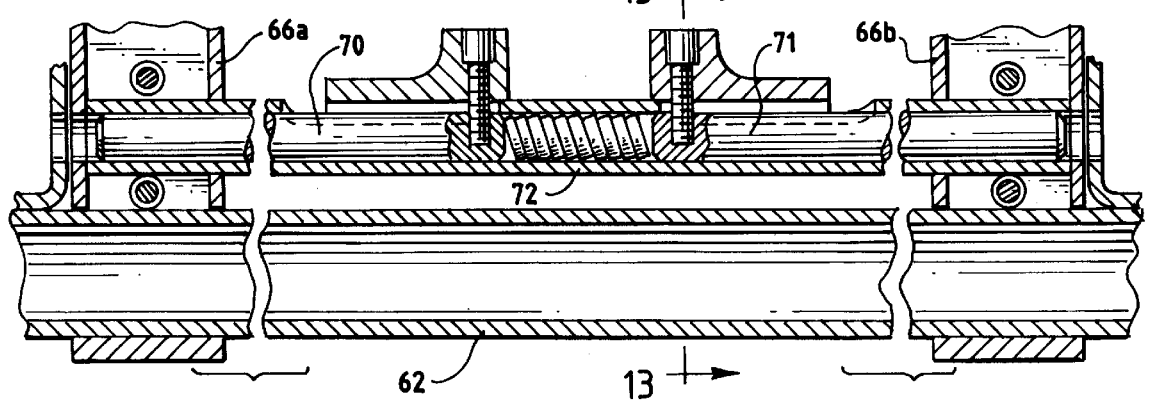
FIG. 12 is the sectional view of FIG. 11, showing the locking pins in a retracted position.
Figure 13:
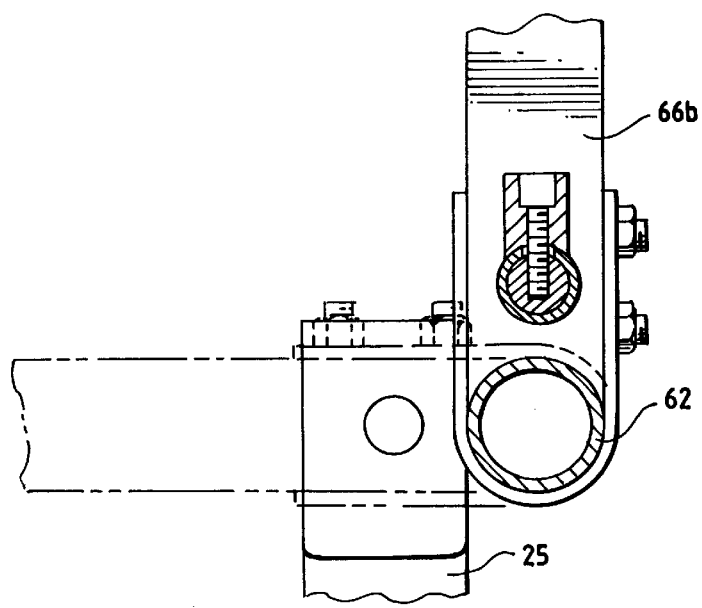
FIG. 13 is a sectional view taken along line 13—13 in FIG. 12.

Alternatively, the handle assembly H may include a pair of spring biased locking pins 70 and 71 instead of the locking bar 67 (See FIGS. 11–13). In this modification, the pins lie in a tube 72, secured to the bottom portions of the legs 66a and 66b, and extend into openings in the corresponding bracket to lock the member 66 relative to the brackets 58 and 59.

Figure 14:
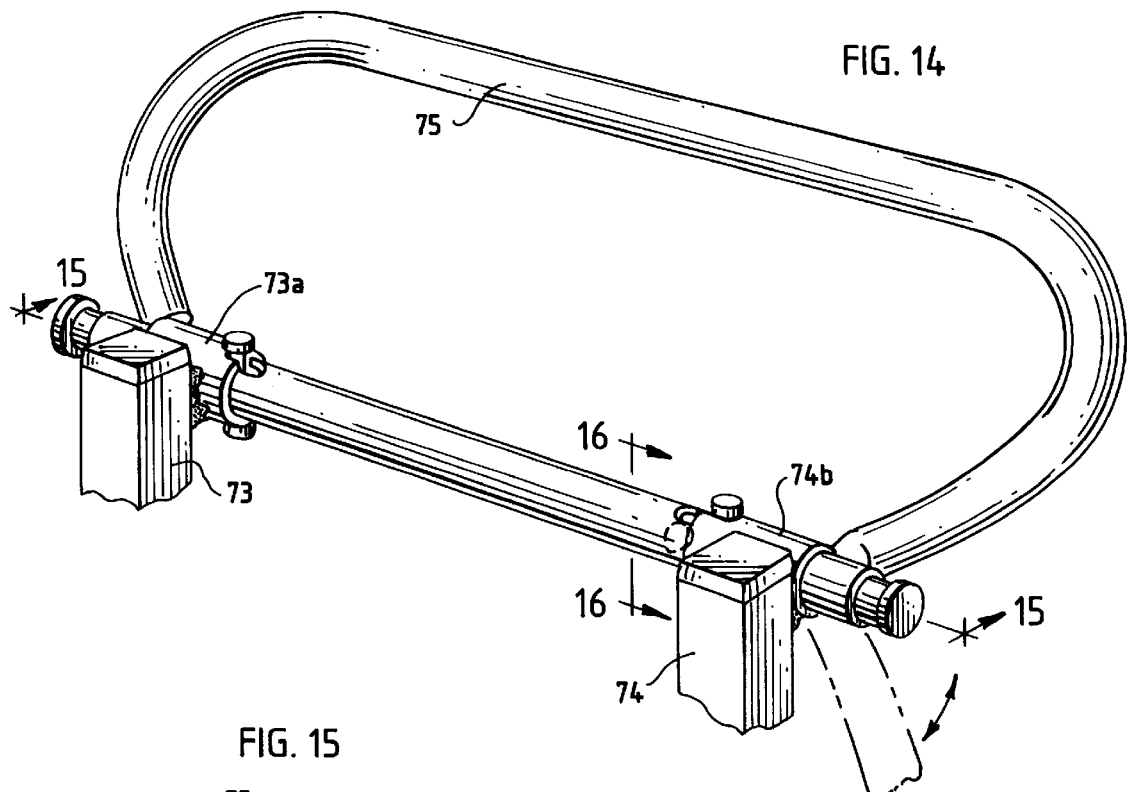
FIG. 14 is a partial perspective view of a modified handle assembly.
Figure 15:
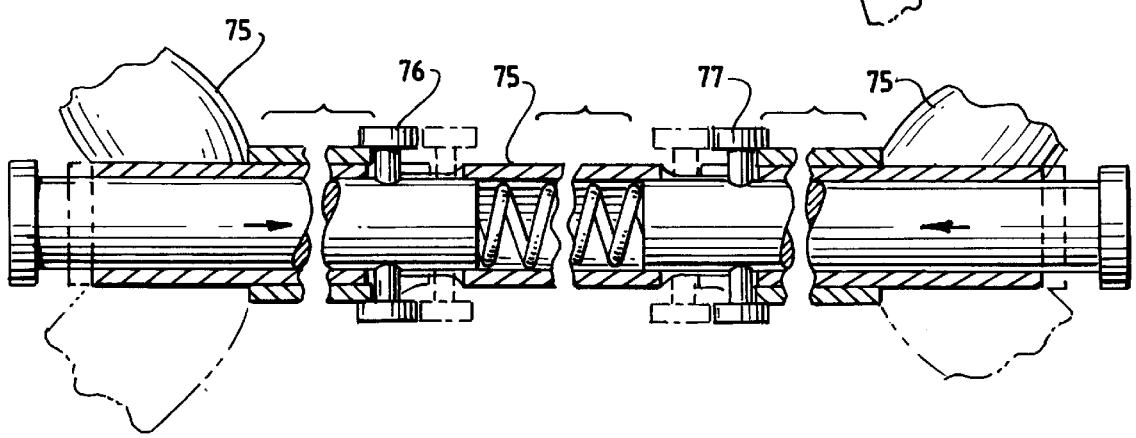
FIG. 15 is a sectional view taken along line 15—15 in FIG. 14.
Figure 16:
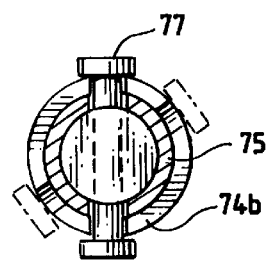
FIG. 16 is a sectional view taken along line 16—16 in FIG. 14.

Finally, FIGS. 14–16, show an alternate handle assembly H¹. This handle assembly does not provide a four-wheel cart construction but a two-wheel hand truck construction. To mount this handle assembly H¹, one need only remove the handle assembly H by releasing the securing means which connects the brackets 58 and 59 to the distal ends of the tubes 23 and 25, inserting the cap-like brackets 73 and 74 over those distal ends, and securing the brackets 73 and 74 in that position.

The handle assembly H¹ includes brackets 73 and 74 with corresponding ring portions 73a and 74a. A pivoting handle member 75 extends through the rings and pivots within their control openings. A pair of spring loaded buttons 76 and 77 cooperate with grooves formed into the sides of the ring portions 73a and 74a to lock the pivoting handle member 75 in the position shown in solid lines in FIG. 14 and in the position partially shown in phantom lines in that same figure.

The various tubes and structural members described above are made of aluminum which provides high strength and rigidity while reducing the weight of the cart 20. Moreover, the various rods, bars, pins, bolts, axles and brackets are made of stainless steel for the added strength and rigidity which stainless steel provides. However, these components may be made of any suitable material, including many plastics and composite materials.

While the above description and the drawings disclose and illustrate one embodiment, one should understand, of course, that the invention is not limited to this embodiment. Those skilled in the art to which the invention pertains may make modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A collapsible and adjustable cart comprising:
   (a) a first tube assembly including first and second tubes, the first tube extending into the second tube in telescoping relation with the second tube;
   (b) a second tube assembly including third and fourth tubes, the third tube extending into the fourth tube in telescoping relation with the fourth tube;
   (c) first latching means disposed between the first and second tube assemblies for locking one tube of each assembly relative to the other tube;
   (d) support means secured to end portions of the second and fourth tubes, said support means including a generally flat plate member that is pivotable about an axis;
   (e) first wheel means rotatably mounted proximate the support means for rolling the cart on a supporting surface when the cart lies in a generally upright position; and
   (f) a handle assembly secured to end portions of the first and third tubes, said handle assembly including a pivotable handle member, said handle member being pivotable over an angle substantially greater than 90°;
   (g) second latching means for locking the Plate member in an extended or retracted position, said second latching means including at least one rod slidably mounted to the plate member.

2. A collapsible and adjustable cart comprising:
   (a) a first tube assembly including first and second tubes, the first tube extending into the second tube in telescoping relation with the second tube;
   (b) a second tube assembly including third and fourth tubes, the third tube extending into the fourth tube in telescoping relation with the fourth tube;
   (c) first latching means disposed between the first and second tube assemblies for locking one tube of each assembly relative to the other tube, said first latching means including a push button actuating member;
   (d) support means secured to end portions of the second and fourth tubes, said support means including a pivotable platform member and means for preventing displacement of the platform member in a direction parallel to its pivot axis;
   (e) first wheel means rotatably mounted proximate the support means for rolling the cart on a supporting surface when the cart lies in a generally upright position;
   (f) a handle assembly secured to end portions of the first and third tubes, said handle assembly including a pivotable handle member and means for preventing displacement of the handle member in a direction parallel to its pivot axis;

(g) second latching means for locking the platform member in an extended or retracted position, said second latching means including at least one rod slidably mounted to the platform member; and (h) third latching means for locking the pivotable handle member in an extended or retracted position.

3. The cart of claim 2, wherein the handle assembly includes second wheel means for rolling the cart on a supporting surface when the cart lies in a reclined position.

* * * * *